(12) United States Patent
Saegusa et al.

(10) Patent No.: US 11,770,092 B2
(45) Date of Patent: Sep. 26, 2023

(54) DRIVE CIRCUIT OF THREE-PHASE DC MOTOR AND ELECTRONIC DEVICE USING THEREOF

(71) Applicant: ROHM CO., LTD., Kyoto (JP)

(72) Inventors: Yuji Saegusa, Kyoto (JP); Joji Noie, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 17/879,004

(22) Filed: Aug. 2, 2022

(65) Prior Publication Data

US 2023/0042290 A1    Feb. 9, 2023

(30) Foreign Application Priority Data

Aug. 5, 2021 (JP) ................................. 2021-129157

(51) Int. Cl.
*H02P 29/024* (2016.01)
*F04D 25/06* (2006.01)

(52) U.S. Cl.
CPC .......... *H02P 29/0241* (2016.02); *F04D 25/06* (2013.01)

(58) Field of Classification Search
CPC .................................................. H02P 29/024
See application file for complete search history.

(56) References Cited

U.S. PATENT DOCUMENTS

| | | | |
|---|---|---|---|
| 2011/0234130 A1* | 9/2011 | Okumura | G01R 31/52 318/400.07 |
| 2016/0134215 A1* | 5/2016 | Earanky | H02P 6/18 318/400.27 |
| 2017/0134018 A1* | 5/2017 | Imanishi | H02M 1/32 |
| 2019/0006964 A1* | 1/2019 | Kurosawa | G11B 19/2009 |
| 2019/0305545 A1* | 10/2019 | Matsumoto | H02H 1/0007 |

FOREIGN PATENT DOCUMENTS

JP    H0746888 A    2/1995

* cited by examiner

*Primary Examiner* — Muhammad S Islam
(74) *Attorney, Agent, or Firm* — CANTOR COLBURN LLP (57) ABSTRACT

A bridge circuit includes a high-side transistor connected between a power supply terminal and an output terminal, and a low-side transistor connected between the output terminal and a ground terminal. A high-side pre-driver and a low-side pre-driver drive the high-side transistor and the low-side transistor. A first transistor is connected between the output terminal and the ground terminal in a manner to form the regenerative path parallel to the low-side transistor. In a regenerative state in which a current sinks from the output terminal, a regenerative control circuit controls the voltage of a control terminal of the first transistor in a manner that an output voltage of the output terminal approaches a target voltage higher than the power supply voltage of the power supply terminal by a first voltage width.

20 Claims, 6 Drawing Sheets

DRIVE CIRCUIT OF THREE-PHASE DC MOTOR AND ELECTRONIC DEVICE USING THEREOF

CROSS REFERENCES TO RELATED APPLICATIONS

The present invention claims priority under 35 U.S.C. § 119 to Japanese Application, 2021-129157, filed on Aug. 5, 2022, the entire contents of which being incorporated herein by reference.

TECHNICAL FIELD

The present disclosure relates to a driving technique for a fan motor.

BACKGROUND

A fan motor used for temperature control is mounted on a laptop computer or desktop computer, an information processing apparatus such as a workstation, an entertainment machine such as a gaming machine, a projector or a surveillance camera, a home appliance such as a microwave or a refrigerator, or a vehicle. A fan motor directly blows a heat source such as a central processing unit (CPU), draws fresh air from outside to inside of a casing, or discharges heated air.

In certain uses, the number of revolutions of a motor is dynamically controlled. When driving is performed by means of pulse width modulation (PWM), a duty cycle of a driving voltage (applying voltage) is dynamically controlled.

PRIOR ART DOCUMENT

Patent Publication

[Patent publication 1] Japan Patent Publication No. 1995-046888

SUMMARY OF THE PRESENT DISCLOSURE

Problems to be Solved by the Present Disclosure

If a duty cycle is drastically reduced, a current flows from a motor coil through an upper arm of an inverter to a power supply line. If the capacity of a capacitor connected to the power supply line is small, there is a concern that the voltage of the power supply line may rise drastically.

The present disclosure is completed in view of the situation above, in an exemplary objective of providing a drive circuit capable of inhibiting the rise in a voltage of a power supply line.

Technical Means for Solving the Problem

According to an embodiment, a drive circuit that is a drive circuit of a three-phase direct-current (DC) motor is provided. Each phase of the drive circuit includes: a bridge circuit, including a high-side transistor connected between a power supply terminal and an output terminal and a low-side transistor connected between the output terminal and a ground terminal; a pre-driver, driving the high-side transistor and the low-side transistor; a first transistor, connected between the output terminal and the ground terminal in a manner to form a regenerative path parallel to the low-side transistor; and a regenerative control circuit, controlling, in a regenerative state in which a current sinks from the output terminal, a voltage of a control terminal of the first transistor in a manner that an output voltage of the output terminal approaches a target voltage higher than a power supply voltage of the power supply terminal by a first voltage width.

Moreover, any combination of the constituting elements above, or mutual replacements or substitutions of the constituent elements of the present disclosure or expressions in methods, devices or systems are to be considered effective implementations of the present disclosure.

Effects of the Present Disclosure

The rise in a voltage of a power supply line can be inhibited by certain implementation forms of the present disclosure.

DETAILED DESCRIPTION OF THE EMBODIMENTS

A summary of several embodiments of the present disclosure are given below. The summary serves as the preamble of the detailed description to be given below, and aims to provide fundamental understanding of the embodiments by describing several concepts of one or more embodiments in brief. It should be noted that the summary is not to be construed as limitation to the scope of the present disclosure. The summary is not a general summary with consideration of all possible embodiments, and is not intended to specify important requirements of all the embodiments, or to divide the scope in some or all of the aspects. For illustration purposes, the term "an/one embodiment" may be used to refer to one embodiment (implementation form or variation example) or a plurality of embodiments (implementation forms or variation examples) disclosed in the description of the present application.

According to an embodiment, a drive circuit that is a drive circuit of a three-phase DC motor is provided. Each phase of the drive circuit includes: a bridge circuit, including a high-side transistor MH connected between a power supply terminal and an output terminal and a low-side transistor connected between the output terminal and a ground terminal; a pre-driver, driving the high-side transistor and the low-side transistor; a first transistor, connected between the output terminal and the ground terminal in a manner to form a regenerative path parallel to the low-side transistor; and a regenerative control circuit, controlling, in a regenerative state in which a current sinks from the output terminal, a voltage of a control terminal of the first transistor in a manner that an output voltage of the output terminal approaches a target voltage higher than a power supply voltage of the power supply terminal by a first voltage width.

According to the above configuration, the first transistor is additionally provided between the output terminal and the ground terminal, such that a path is formed for a coil current to escape from a motor coil into the current of the bridge circuit. The first transistor is controlled by the regenerative control circuit, so that a power supply voltage of the power supply terminal can be stabilized to a voltage level of a reference voltage higher than the output voltage of the output terminal. Thus, a drastic increase in the power supply voltage can be prevented.

In one embodiment, the regenerative control circuit may forcibly turn off the high-side transistor when the output voltage exceeds a threshold voltage higher than the power supply voltage by a second voltage width.

In one embodiment, the regenerative control circuit may cut off the regenerative path when the output voltage is lower than the threshold voltage higher than the power supply voltage by a second voltage width.

In one embodiment, the regenerative control circuit may include an amplifier that amplifies an error between the output voltage and the target voltage, and control a voltage of the control terminal of the first transistor based on an output of the amplifier.

In one embodiment, the regenerative control circuit may include a comparator that compares the output voltage with the threshold voltage.

In one embodiment, the regenerative control circuit may fix the first transistor at an off state when the output voltage is lower than the threshold voltage.

In one embodiment, the drive circuit may further include a second transistor connected between the control terminal of the first transistor and the ground terminal, wherein the regenerative control circuit turns on the second transistor when the output voltage is lower than the threshold voltage.

In one embodiment, the drive circuit may further include a third transistor, on the regenerative path, connected in series with the first transistor and connecting to a gate and a drain. By inserting the third transistor, hot carrier tolerance of the first transistor can be improved, and a margin for damage of an area of safe operation (ASO) of the first transistor can be increased.

In one embodiment, the drive circuit may further include a fourth transistor on the regenerative path and connected in series with the first transistor, wherein the regenerative control circuit turns off the fourth transistor when the output voltage is lower than the threshold voltage.

In one embodiment, the drive circuit may further include a first switch connected between a gate and a drain of the fourth transistor, wherein the regenerative control circuit turns on the first switch when the output voltage is higher than the threshold voltage. By inserting the fourth transistor, hot carrier tolerance of the first transistor can be improved, and a margin for damage of an ASO of the first transistor can be increased.

In one embodiment, the driving circuit may be integrated on a semiconductor substrate. The term "integrated" may refer to a situation where constituting elements of a circuit are all formed on a semiconductor substrate, and a situation where main constituent elements of a circuit are integrated. Alternatively, part of resistors or capacitors may be arranged outside the semiconductor substrate in order to adjust circuit constants. By integrating a circuit on a chip, the circuit area is reduced and characteristics of circuit elements may be kept uniform.

EMBODIMENTS

Preferred embodiments are described with reference to drawings below. The same or equivalent constituting elements, components or processes shown in the drawings are assigned with the same denotations, and repeated description is appropriately omitted. It should be noted that the embodiments are non-limiting examples of the present disclosure, and not all features or combinations thereof described in the embodiments are necessarily essentials of the present disclosure.

In the description of the application, an expression "a state of component A connected to component B" includes, in addition to a situation where component A and component B are directly connected, a situation where component A is indirectly connected to component B via another component, without imposing substantial influences on their electrical connection states or without impairing functions or effects exerted by a combination of the two.

Similarly, an expression "a state of component C connected to component A and component B" includes, in addition to a situation where component A and component C or component B and component C are directly connected, a situation an indirect connection, without imposing substantial influences on their electrical connection states or without impairing functions or effects exerted by a combination of the three.

First Embodiment

Figure 1:
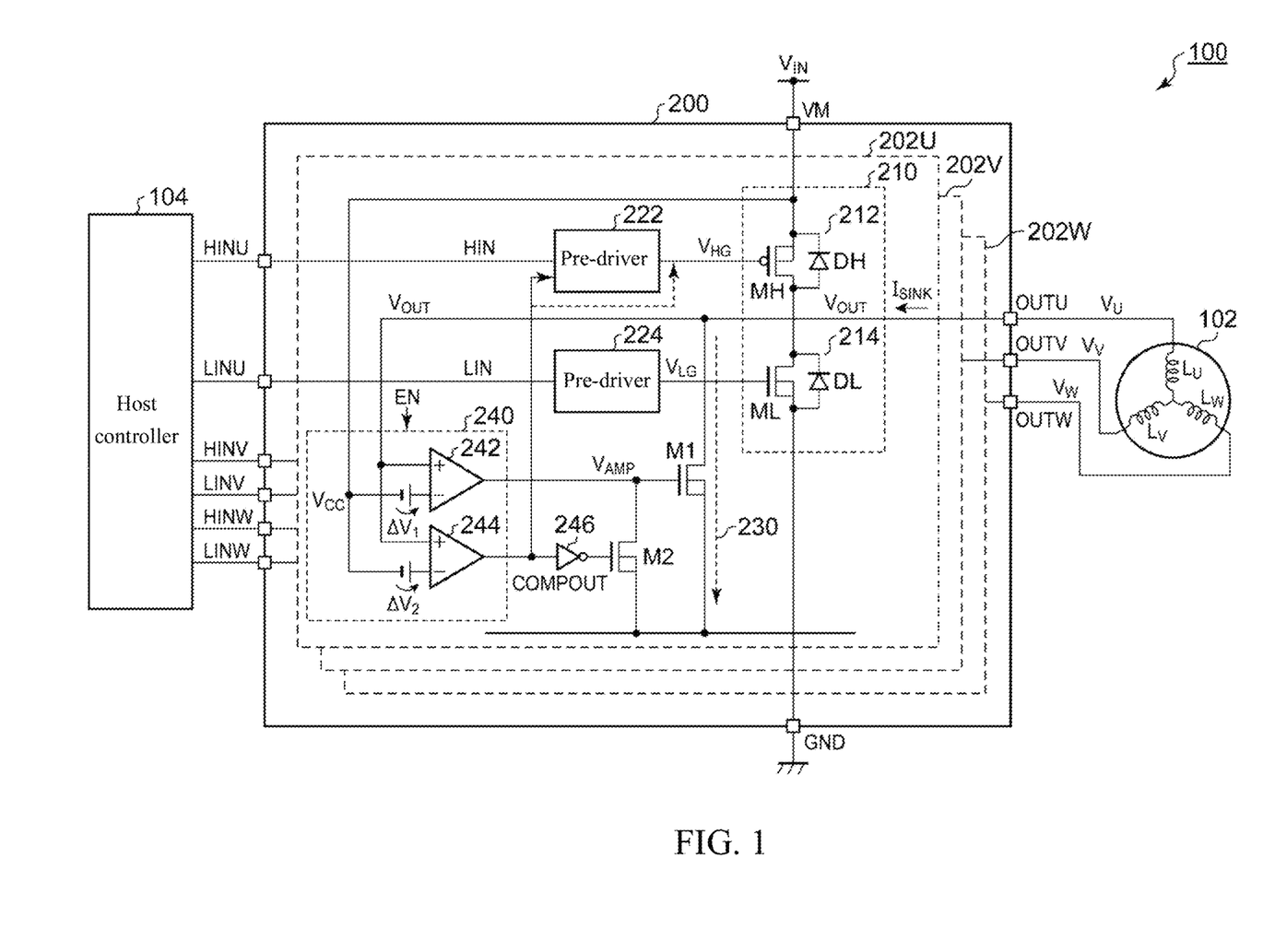
FIG. 1 is a circuit diagram of a machine including a drive circuit according to a first embodiment.

FIG. 1 shows a circuit diagram of a machine 100 including a drive circuit 200 according to a first embodiment. The machine 100 includes a motor 102, a host controller 104 and a drive circuit 200. The motor 102 is a three-phase brushless DC motor, and includes a U-phase coil $L_U$, a V-phase coil $L_V$ and W-phase coil $L_W$.

Output terminals OUTU to OUTV of three phases of the drive circuit 200 are connected to the coils $L_U$, $L_V$ and $L_W$. The drive circuit 200 drives the motor 102 according to a control signal from the host controller 104. The driving circuit 200 is integrated on a semiconductor substrate or is a function integrated circuit (IC) with multiple chips encapsulated in one package.

The control signal (the name of the control signal is the same as the name of a terminal hereinafter) from the host controller 104 is input to input terminals HINU to HINW and LINU to LINW of the drive circuit 200. The drive circuit 200 outputs the voltage $V_U$ of OUTU based on the U-phase control signals HINU and LINU, outputs the voltage $V_V$ of OUTV based on the V-phase control signals HINV and LINV, and outputs the voltage Vw of OUTW based on the W-phase control signals HINW and LINW. The control signals HINU, LINU, HINV, LINV, HINW and LINW generated by the host controller 104 are pulse width modulated. Means for controlling the host controller 104 is not specifically defined.

The control means or circuit configuration of the host controller 104 is not specifically defined, and may be implemented by commonly known techniques. Specifically, the host controller 104 may control the motor 102 by a control of wide-angle energization with an energization angle of 120° or more and less than 180° (for example, 120°, 135° or) 150°, or may control the motor 102 by a 180-degree energization control (or referred to as sine wave driving). The host controller 104 may also perform the control of wide-angle energization (for example, a 120-degree energization control) after start-up of the motor 102 rotating at a smaller number of revolutions, and perform a 180-degree energization control once the motor 102 has reached a stable number of revolutions.

A power supply voltage $V_{CC}$ is supplied to a power supply terminal VM of the drive circuit 200. Moreover, a ground terminal GND of the drive circuit 200 is grounded.

The drive circuit 200 includes a U-phase driver 202U, a V-phase driver 202V and a W-phase driver 202W. Although FIG. 1 depicts only the configuration of the U-phase driver 202U, the V-phase driver 202V and the W-phase driver 202W are identically structured as the U-phase driver 202U.

The U-phase driver 202U includes a bridge circuit 210, a high-side pre-driver 222 and a low-side pre-driver 224, a regenerative path 230 and a regenerative control circuit 240.

The bridge circuit 210 includes an upper arm 212 and a lower arm 214. The upper arm 212 includes a high-side transistor MH and a flywheel diode (return diode) DH connected in parallel between the power supply terminal VM and the output terminal OUT. The lower arm 214 includes a low-side transistor ML and a flywheel diode DL connected in parallel between the output terminal OUT and the ground terminal GND. The high-side transistor MH is a P-channel metal oxide semiconductor field effect transistor (MOSFET), the low-side transistor ML is an N-channel MOSFET, and a body diode between the back gate and the drain of the MOSFET functions as the flywheel diodes DH and DL. The high-side transistor MH and the low-side transistor ML may also be insulated gate bipolar transistors (IGBTs) or other transistors, and in this case, the flywheel diodes DH, DL and the IGBT are connected in parallel.

The high-side pre-driver 222 drives the high-side transistor MH according to a high-side control signal HIN. Herein, HIN=H (high) is associated with turning on of the high-side transistor MH, and HIN=L (low) is associated with turning off of the high-side transistor MH.

The low-side pre-driver 224 drives the low-side transistor ML according to a low-side control signal LIN. Herein, LIN=H (high) is associated with turning on of the low-side transistor ML, and LIN=L (low) is associated with turning off of the low-side transistor ML.

A first transistor M1 is connected between the output terminal OUT and the ground terminal GND in a manner to form the regenerative path 230 parallel to the low-side transistor ML. Specifically, the first transistor M1 is an N-channel MOSFET, which has its source connected to the ground terminal GND, and its drain connected to the output terminal OUT.

The regenerative control circuit 240 is enabled in a regenerative state in which a coil current sinks from the output terminal OUT. The regenerative control circuit 240 controls the voltage of a control terminal (gate) of the first transistor M1 in a manner that an output voltage $V_{OUT}$ of the output terminal OUT approaches a target voltage $V_{REF}=V_{CC}+\Delta V_1$ that is higher than the power supply voltage $V_{CC}$ of the power supply terminal VM by a first voltage width $\Delta V_1$.

The regenerative control circuit 240 forcibly turns off the high-side transistor MH when the output voltage $V_{OUT}$ exceeds a threshold voltage $V_{TH}=V_{CC}+\Delta V_2$ that is higher than the power supply voltage $V_{CC}$ by a second voltage width $\Delta V_2$. Wherein, $\Delta V_2 < \Delta V_1 < Vf$, where Vf is a forward voltage of the flywheel diode (the body diode of the high-side transistor MH) of the upper arm 212. For example, $\Delta V_1 = 50$ mV and $\Delta V_2 = 20$ mV. Thus, the state of a sink current flowing through the body diode of the high-side transistor MH can be detected.

The regenerative control circuit 240 may also control the state of the high-side pre-driver 222 by means of turning off the high-side transistor MH, so as to also directly change a gate voltage $V_{HG}$ of the high-side transistor MH.

Moreover, the regenerative control circuit 240 cuts off the regenerative path 230 when the output voltage $V_{OUT}$ is lower than the threshold voltage $V_{TH}$. In this embodiment, the regenerative control circuit 240 fixes the first transistor M1 at an off state when the output voltage $V_{OUT} < V_{TH}$. In order to fix the first transistor M1 at an off state, a second transistor M2 is provided between the gate of the first transistor M1 and the ground terminal GND. The second transistor M2 is an N-channel MOSFET, which has its source connected to the ground terminal GND, and its drain connected to the control terminal (gate) of the first transistor M1. When $V_{OUT} < V_{TH}$, the regenerative control circuit 240 applies a high voltage to the gate of the second transistor M2, and sets the second transistor M2 to an on state, thereby fixing the gate voltage of the first transistor M1 at low (L).

The regenerative control circuit 240 includes an amplifier 242 and a comparator 244. The amplifier 242 receives the output voltage $V_{OUT}$ and the power supply voltage $V_{CC}$. An output of the amplifier 242 is connected to the gate of the first transistor M1, and an output voltage $V_{AMP}$ of the amplifier 242, that is, the gate voltage of the first transistor M1, receives feedback control in a manner that $V_{OUT}=V_{CC}+\Delta V_1$ is established. The first transistor M1 and the amplifier 242 operate in a manner of a voltage regulator connected in parallel to stabilize the voltage $V_{OUT}$ of the output terminal OUT.

The comparator 244 receives the output voltage $V_{OUT}$ and the power supply voltage $V_{CC}$. The comparator 244 compares the output voltage $V_{OUT}$ with the threshold voltage $V_{TH}=V_{CC}+\Delta V_2$, and generates a comparison signal COMPOUT indicative of a comparison result. In this example, COMPOUT=H when $V_{OUT}>V_{TH}$, and COMPOUT=L when $V_{OUT}<V_{TH}$. The comparison signal COMPOUT is inverted by an inverter 246, and input to the gate of the second transistor M2.

The configuration of the drive circuit 200 is as described above. The operation details thereof are described below.

Figure 2:
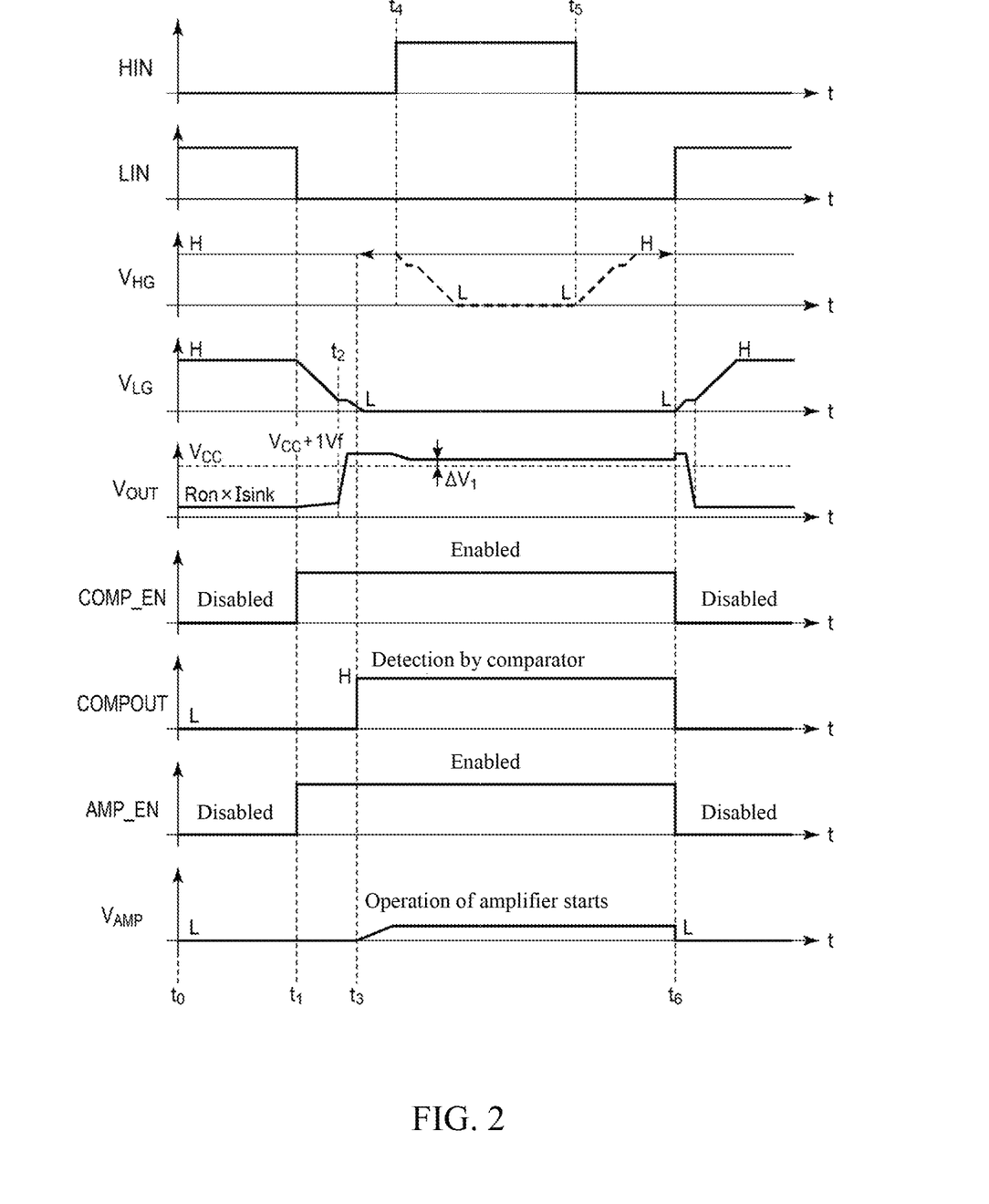
FIG. 2 is a timing diagram of an operation of the drive circuit in FIG. 1.

FIG. 2 shows a timing diagram of an operation of the drive circuit 200 in FIG. 1. FIG. 2 shows a current sink state, that is, an operation of a current sink phase, in the three phases U to W. From top to bottom, the drawing sequentially depicts the high-side control signal HIN, the low-side control signal LIN, the gate voltage $V_{HG}$ of the high-side transistor MH, the gate voltage $V_{LG}$ of the low-side transistor ML, the output voltage $V_{OUT}$ of the output terminal OUT, an enable/disable state EN_COMP of the comparator 244, the comparison output OUT, an enable/disable state EN_AMP of the amplifier 242, and the output signal $V_{AMP}$ of the amplifier 242.

Between timings $t_0$ to $t_1$, the low-side transistor ML is on and the high-side transistor MH is off. In the current sink state, a sink current $I_{SINK}$ flows from the output terminal OUT through the low-side transistor ML to the ground terminal GND. At this point, the output voltage $V_{OUT}$ is $R_{ON} \ast I_{SINK}$, where $R_{ON}$ is an on resistance of the low-side transistor ML.

Between the timings $t_0$ to $t_1$, an enable signal of the regenerative control circuit 240 is disabled, and both the amplifier 242 and the comparator 244 are disabled (invalid). Thus, the comparison signal COMPOUT=L, the second transistor M2 is on, and the first transistor M1 is fixed at an off state.

At the timing $t_1$, if the low-side control signal LIN transitions to L, the amplifier 242 and the comparator 244 become enabled. The low-side pre-driver 224 sinks an off current from the low-side transistor ML, so as to lower the gate voltage $V_{LG}$ of the low-side pre-driver 224 with a constant slope. If the low-side transistor ML is turned off at a timing $t_2$, the sink current $I_{SINK}$ flows to the body diode (flywheel diode) DH of the high-side transistor MH. As a result, the output voltage $V_{OUT}$ rises to $V_{CC}$+Vf, where Vf is a forward voltage of the body diode DH, and $V_{OUT}$=$V_{CC}$+Vf.

Because $\Delta V_2$<Vf, $V_{OUT}$>$V_{TU}$ is established, and at a timing $t_3$, the comparison signal COMPOUT transitions to H. Thus, the second transistor M2 is turned off and the fixed off state of the first transistor M1 is released. With the amplifier 242, the gate voltage $V_{AMP}$ of the first transistor M1 is feedback controlled, and the output voltage $V_{OUT}$ is stabilized at the target voltage $V_{REF}$=$V_{CC}$+$\Delta V_1$. At this point, a part or all of the sink current $I_{SINK}$ flows through the regenerative path 230 including the first transistor M1 to the ground terminal GND. A part of the sink current $I_{SINK}$ may also flow out from the power terminal VM through the flywheel diode DH of the upper arm 212.

At a timing $t_4$, the high-side control signal HIN transitions to H. Usually the high-side pre-driver 222 causes the gate voltage $V_{HG}$ to transition to L as shown by the dotted lines, and turns on the high-side transistor HL; however, due to the asserted comparison signal COMPOUT, the gate voltage $V_{HG}$ is fixed at an off level (H). As a result, the high-side transistor MH is not turned on.

At a timing $t_5$, the high-side control signal HIN transitions to L. Since the gate voltage $V_{HG}$ of the high-side transistor MH is at an off level, there is no change.

At the timing $t_6$, if the low-side control signal LIN transitions to H, the regenerative control circuit 240 becomes disabled, and the amplifier 242 and the comparator 244 both become disabled. With the transition of the comparison signal COMPOUT to L, the first transistor M1 is fixed at an off state.

The low-side pre-driver 224 supplies an on current to the gate of the low-side transistor ML, such that the gate voltage $V_{LG}$ of the low-side transistor ML rises to turn on the low-side transistor ML. If the low-side transistor ML is turned on, the sink current $I_{SINK}$ flows to the low-side transistor ML. Thus, the state is returned to the same as that at the timing to.

The operation of the drive circuit 200 is as described above. According to the drive circuit 200, in the current sink state, the sink current $I_{SINK}$ can escape through the regenerative path 230 to the side of the ground terminal GND, hence inhibiting the rise in the power supply voltage $V_{CC}$ caused by excessive current flowing into the power supply line.

A method of using the low-side transistor ML to allow the sink current to escape to the side of the ground terminal GND can also be considered, as a substitution for the regenerative path 230 formed with the additional first transistor M1. This is referred to as a comparison technique.

This embodiment has the following advantages compared to the comparison technique.

In this embodiment, the first transistor M1 performs a linear operation relative to drain-source voltage, and the low-side transistor ML is turned on and turned off. The linear operation refers to an operation mode of flowing of a drain current when the drain-source voltage is non-zero. On the other hand, in the comparison technique, the low-side transistor ML needs to be turned on/off, and the linear operation needs to be performed.

In the linear operation during regeneration, the gate voltage of the transistor needs to be instantaneously charged at a high speed to a threshold voltage, and thus a small gate capacitance of a transistor is expected. That is, it is expected that a transistor has a smaller size during regeneration. On the other hand, during turning on/off, in order to satisfy heating requirements during turning on/off, a specified on resistance also needs to be met. That is, the size of a transistor is dependent on a specified on resistance value.

In this embodiment, with the separately designed low-side transistor ML and first transistor M1, both objectives of high-speed responsiveness and a specified on resistance can be achieved compared to when the low-side transistor ML is in charge of both these functions.

Moreover, in the linear operation during regeneration, because the drain-source voltage is kept at the voltage $V_{CC}$+$\Delta V_1$ and the operation is performed with the gate voltage being around the threshold voltage, a transistor also needs to meet requirements of hot carrier tolerance. The hot carrier tolerance is ensured by increasing a gate length L. On the other hand, the on resistance is determined by a ratio W/L of a gate width W to the gate length L. In order to achieve a specified on resistance and a reduced area, reducing of the gate width W is expected. However, when both ensured hot carrier tolerance and a specified on resistance are to be achieved by one transistor, it is possible that a size of the transistor, that is, a product of the gate width W and the gate length L, is greater than a total size of a transistor for the linear operation and a transistor for turning on/off that are separately designed.

For example, in order to ensure hot carrier tolerance, L=1 is needed. Moreover, according to a required on resistance, the low-side transistor ML needs to meet W/L=4000 and the first transistor M1 needs to meet W/L=10000. As an example, the low-side transistor ML is designed according to W=20000 and L=0.5, and the first transistor M1 is designed according to L=1000 and L=1. At this point, the area of the low-side transistor ML is W*L=10000, and the area of the first transistor M1 is W*L=10000, totaling up to 20000.

In the comparison technique, only the design of the low-side transistor ML needs to be considered. In this case, the gate length L of the low-side transistor ML needs to be set to 1. Because the low-side transistor ML needs to satisfy W/L=40000, it is necessary to design W=40000 when L=1. In this case, the area of the low-side transistor ML is W*L=40000, which is twice of the value 20000 of the above embodiment.

In other words, in this embodiment, with the separately designed low-side transistor ML and first transistor M1, the total area may be reduced compared to when the low-side transistor ML is in charge of both the functions.

Second Embodiment

Figure 3:
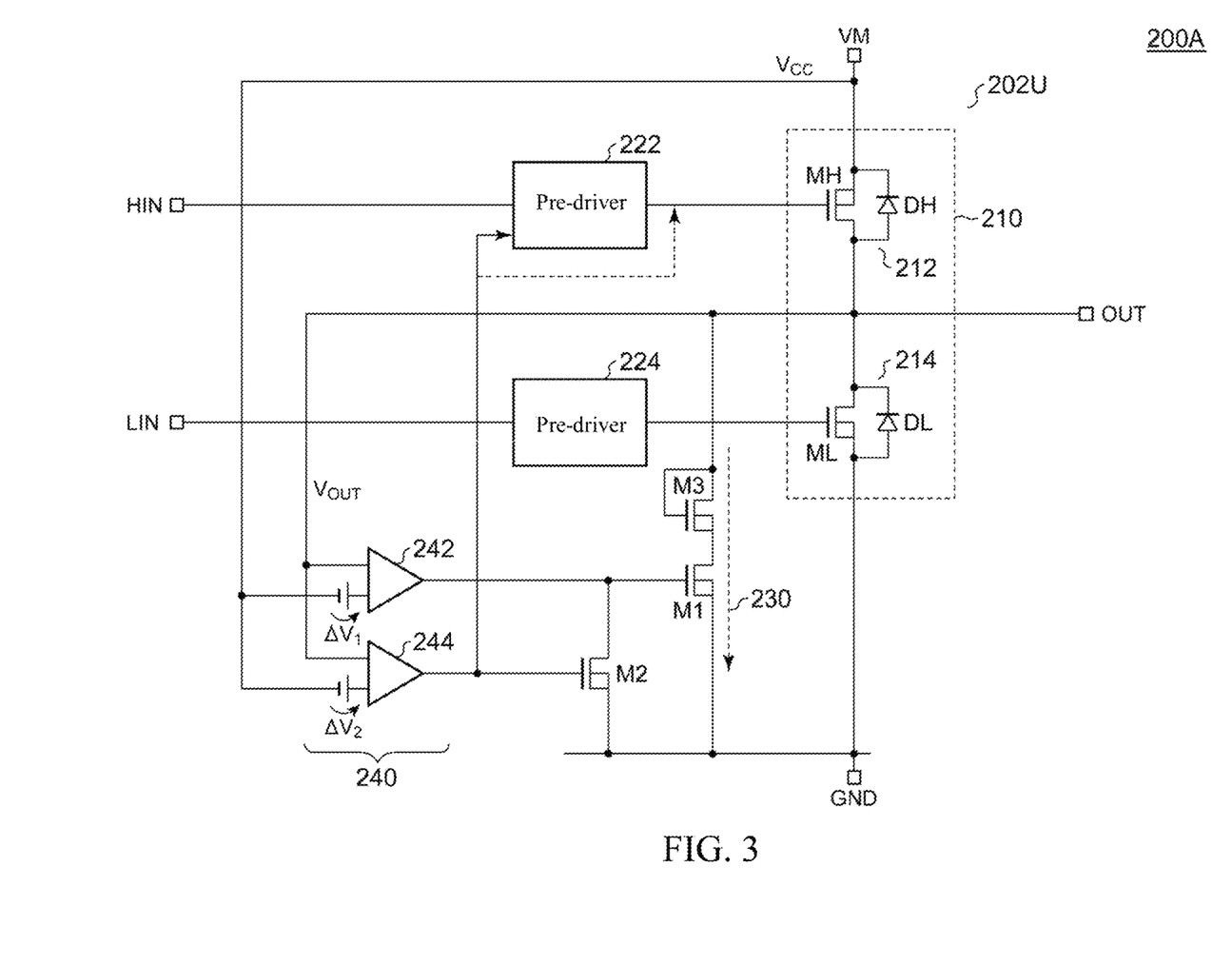
FIG. 3 is a circuit diagram of a drive circuit according to a second embodiment.

FIG. 3 shows a circuit diagram of a drive circuit 200A according to a second embodiment. Although FIG. 3 depicts only the configuration of the U-phase driver 202U, the V-phase driver 202V and the W-phase driver 202W are identically structured.

In the second embodiment, the U-phase driver 202U is on the regenerative path 230 and further includes a third transistor M3 connected in series with the first transistor M1. The third transistor M3 is an N-channel MOSFET, and has its gate and drain connected.

The third transistor M3 generates a voltage drop equivalent to a gate-source voltage $V_{GS}$. A drain-source voltage $V_{DS}$ of the first transistor M1 is reduced by the amount of the voltage drop $V_{GS}$. Thus, a margin for damage of an ASO of the first transistor can be increased.

In the above comparison technique, it should be noted that an element equivalent to the third transistor M3 connected in series with the low-side transistor ML cannot be inserted.

Moreover, the first transistor M1 and the third transistor M3 can be exchanged. That is, the third transistor M3 can also be inserted to the side closer to the ground terminal GND than the first transistor M1.

In addition, the third transistor M3 can also be formed by a P-channel MOSFET in which the gate and the drain are connected.

Third Embodiment

Figure 4:
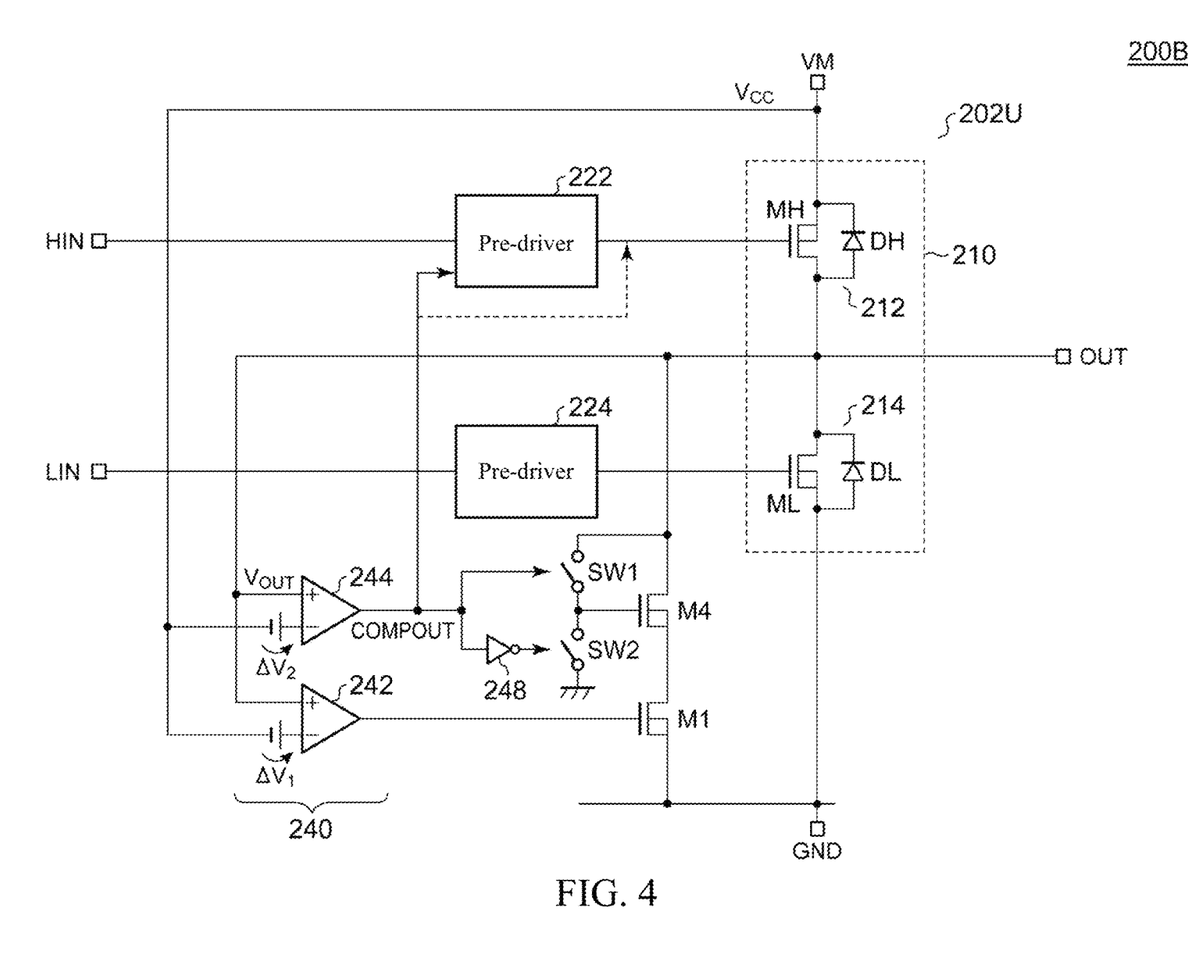
FIG. 4 is a circuit diagram of a drive circuit according to a third embodiment.

FIG. 4 shows a circuit diagram of a drive circuit 200B according to a third embodiment. In the third embodiment, a fourth transistor M4 is designed in substitution for the second transistor M2 and the third transistor M3 in FIG. 3. The fourth transistor M4 is an N-channel MOSFET, and is arranged in series with the first transistor M1 on the regenerative path 230.

A first switch SW1 is connected between the gate and the drain of the fourth transistor M4, and a second switch SW2 is connected between the gate of the fourth transistor M4 and the ground terminal.

The first switch SW1 is controlled by the output COMPOUT of the comparator 244, and becomes on under the voltage regulation of the amplifier 242 and the first transistor M1. When the first switch SW1 is on, the fourth transistor M4 and the first switch SW1 produce an effect the same as that of the third transistor M3 in FIG. 3.

An inverter 248 inverts the output COMPOUT of the comparator 244, and controls the second switch SW2. That is, the second switch SW2 and the first switch SW1 are controlled in a complementary manner. While the comparison signal COMPOUT is L, by turning on the second switch SW2, the fourth transistor M4 is fixed at an off state. Thus, the regenerative path 230 is disconnected.

Fourth Embodiment

In the first to third embodiments, the upper arm 212 is formed by a P-channel MOSFET; however, the upper arm 212 is not limited to such examples and may be formed by an N-channel MOSFET.

Figure 5:
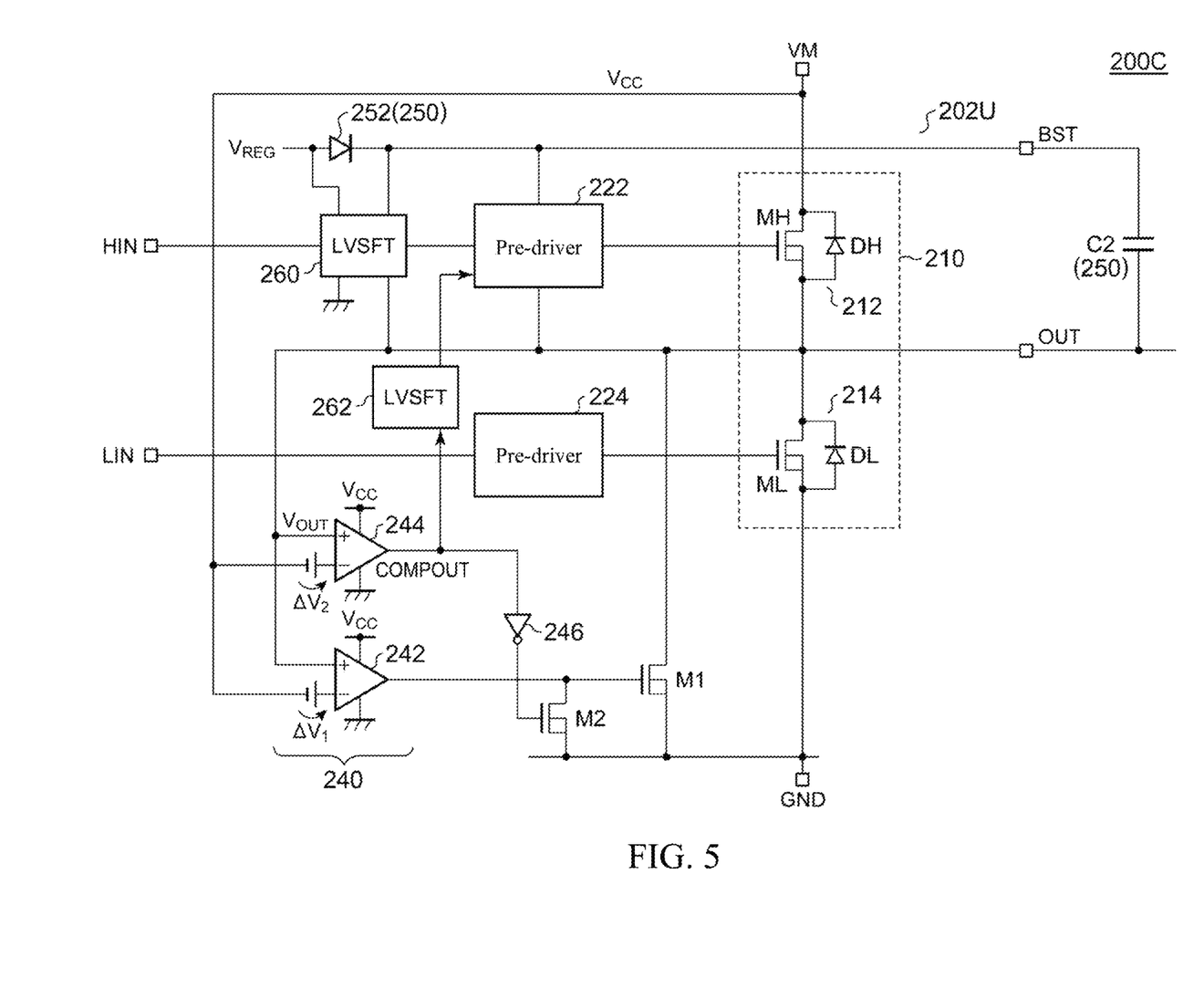
FIG. 5 is a circuit diagram of a drive circuit according to a fourth embodiment.

FIG. 5 shows a circuit diagram of a drive circuit 200C according to a fourth embodiment. The high-side transistor MH is an N-channel MOSFET. In addition to the drive circuit 200 of FIG. 1, the drive circuit 200C includes a bootstrap startup circuit 250 and level shifters 260 and 262.

The bootstrap startup circuit 250 includes an external bootstrap startup capacitor C2, and a diode or a switch, that is, a rectifying element 252.

The level shifter 260 shifts the level of the high-side control signal HIN, which is then supplied to the high-side pre-driver 222.

The output COMPOUT of the comparator 244 passes through the level shifter 262 and is supplied to the high-side pre-driver 222. The high-side pre-driver 222 fixes the high-side transistor MH to off when the comparison signal COMPOUT=H.

Moreover, the output COMPOUT of the comparator 244 is input to the inverter 246. The second transistor M2 is turned on when the comparison signal COMPOUT=L.

In this example, a driving voltage higher than the power supply voltage $V_{CC}$ is generated by the bootstrap startup circuit for the high-side transistor MH; however, a driving voltage for the high-side transistor MH may also be generated by a charge pump circuit.

In addition, the high-side transistor MH of the second or third embodiment may also be formed by a P-channel MOSFET.

(Use)

Figure 6:
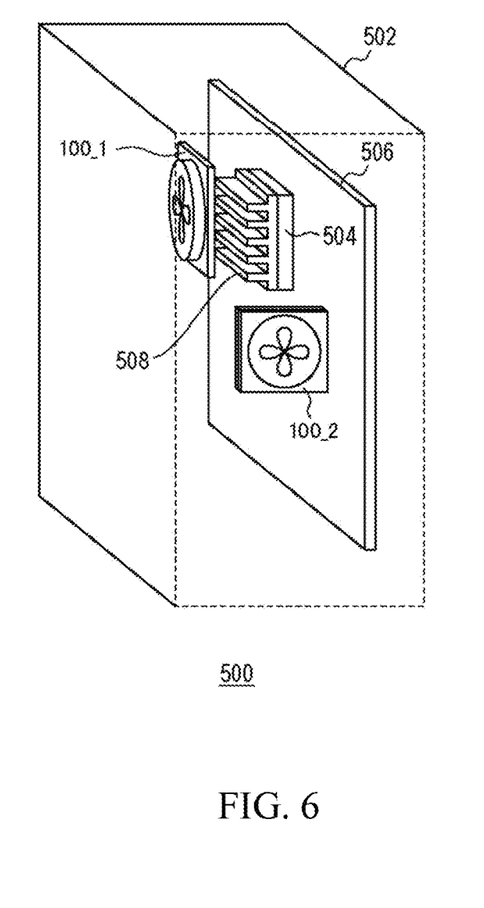
FIG. 6 is a perspective diagram of a computer having a drive circuit.

Lastly, the use of the driving circuit 200 is described below. FIG. 6 shows a perspective diagram of a computer having the drive circuit 200. In this example, the machine 100 is a cooling device, and includes the motor 102 and the above drive circuit 200. The computer 500 includes a casing 502, a CPU 504, a motherboard 506, a cooling fins 508 and a plurality of cooling devices 100_1 and 100_2.

The CPU 504 is mounted on the motherboard 506. The cooling fins 508 are tightly joined with an upper surface of the CPU 504. The cooling device 100_1 is arranged to face the cooling fins 508, and blows air to the cooling fins 508. The cooling device 100_2 is arranged on a back surface of the casing 502, and draws air on the outside of the casing 502 to the inside or discharges the air on the inside to the outside.

In addition to the computer 500 in FIG. 6, the cooling device 100 may also be mounted on various electronic machines such as workstations, laptop computers, television and refrigerators.

Moreover, the use of the driving circuit 200 of the embodiments is not limited to driving a fan motor, and may be used to drive other types of motors.

The embodiments described in specific terms are for representing the principles and applications of the present disclosure, and numerous modifications to the variation examples or configurations of the embodiments can be made without departing from the scope of the concept of the present disclosure accorded with the appended claims.

The invention claimed is:

1. A drive circuit, which is a drive circuit of a three-phase DC motor, each phase of the drive circuit comprising:
    a bridge circuit, including a high-side transistor connected between a power supply terminal and an output terminal and a low-side transistor connected between the output terminal and a ground terminal;
    a pre-driver, driving the high-side transistor and the low-side transistor;
    a first transistor, connected between the output terminal and the ground terminal in a manner to form a regenerative path parallel to the low-side transistor; and
    a regenerative control circuit, in a regenerative state in which a current sinks from the output terminal, controlling a voltage of a control terminal of the first transistor in a manner that an output voltage of the output terminal approaches a target voltage higher than a power supply voltage of the power supply terminal by a first voltage width.

2. The drive circuit of claim 1, wherein the regenerative control circuit forcibly turns off the high-side transistor when the output voltage exceeds a threshold voltage higher than the power supply voltage by a second voltage width.

3. The drive circuit of claim 1, wherein the regenerative control circuit cuts off the regenerative path when the output voltage is lower than the threshold voltage higher than the power supply voltage by a second voltage width.

4. The drive circuit of claim 2, wherein the regenerative control circuit cuts off the regenerative path when the output voltage is lower than the threshold voltage higher than the power supply voltage by the second voltage width.

5. The drive circuit of claim 1, wherein
the regenerative control circuit includes an amplifier that amplifies an error between the output voltage and the target voltage and controls a voltage of the control terminal of the first transistor based on an output of the amplifier.

6. The drive circuit of claim 2, wherein
the regenerative control circuit includes an amplifier that amplifies an error between the output voltage and the target voltage and controls a voltage of the control terminal of the first transistor based on an output of the amplifier.

7. The drive circuit of claim 3, wherein
the regenerative control circuit includes an amplifier that amplifies an error between the output voltage and the target voltage and controls a voltage of the control terminal of the first transistor based on an output of the amplifier.

8. The drive circuit of claim 2, wherein the regenerative control circuit includes a comparator that compares the output voltage with the threshold voltage.

9. The drive circuit of claim 3, wherein the regenerative control circuit includes a comparator that compares the output voltage with the threshold voltage.

10. The drive circuit of claim 3, wherein the regenerative control circuit fixes the first transistor at an off state when the output voltage is lower than the threshold voltage.

11. The drive circuit of claim 10, further comprising a second transistor connected between the control terminal of the first transistor and the ground terminal, wherein the regenerative control circuit turns on the second transistor when the output voltage is lower than the threshold voltage.

12. The drive circuit of claim 1, further comprising a third transistor, on the regenerative path, connected in series with the first transistor and connecting to a gate and a drain.

13. The drive circuit of claim 2, further comprising a third transistor, on the regenerative path, connected in series with the first transistor and connecting to a gate and a drain.

14. The drive circuit of claim 3, further comprising a third transistor, on the regenerative path, connected in series with the first transistor and connecting to a gate and a drain.

15. The drive circuit of claim 5, further comprising a third transistor, on the regenerative path, connected in series with the first transistor and connecting to a gate and a drain.

16. The drive circuit of claim 2, further comprising a fourth transistor, on the regenerative path, connected in series with the first transistor, wherein the regenerative control circuit turns off the fourth transistor when the output voltage is lower than the threshold voltage.

17. The drive circuit of claim 16, further comprising a first switch connected between a gate and a drain of the fourth transistor, wherein the regenerative control circuit turns on the first switch when the output voltage is higher than the threshold voltage.

18. The drive circuit of claim 1, wherein the drive circuit is integrated on a semiconductor substrate.

19. The drive circuit of claim 1, wherein the three-phase DC motor is a fan motor.

20. An electronic device, comprising the drive circuit of claim 1.

* * * * *